United States Patent
Youn et al.

(10) Patent No.: US 8,355,356 B2
(45) Date of Patent: Jan. 15, 2013

(54) METHOD FOR COMMUNICATING IN A MOBILE STATION AND SYSTEM WITH RELAY STATIONS

(75) Inventors: Ae Ran Youn, Gyeonggi-do (KR); Ki Seon Ryu, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 843 days.

(21) Appl. No.: 12/399,806

(22) Filed: Mar. 6, 2009

(65) Prior Publication Data

US 2009/0227258 A1 Sep. 10, 2009

(30) Foreign Application Priority Data

Mar. 6, 2008 (KR) .................. 10-2008-0020886

(51) Int. Cl.
*H04B 7/14* (2006.01)
(52) U.S. Cl. .................. 370/315; 370/329; 370/332
(58) Field of Classification Search .................. None
See application file for complete search history.

(56) References Cited

U.S. PATENT DOCUMENTS

| | | | | |
|---|---|---|---|---|
| 6,854,058 B2 * | 2/2005 | Carroll | .................. | 713/168 |
| 7,738,835 B2 * | 6/2010 | Oh et al. | .................. | 455/7 |
| 2003/0007638 A1 | 1/2003 | Carroll | | |
| 2007/0160014 A1 | 7/2007 | Larsson | | |
| 2007/0270113 A1 | 11/2007 | Oh et al. | | |
| 2008/0019321 A1 | 1/2008 | Kim et al. | | |

FOREIGN PATENT DOCUMENTS

| | | |
|---|---|---|
| CN | 1902868 | 1/2007 |
| WO | 2007055544 | 5/2007 |

\* cited by examiner

*Primary Examiner* — Kwang B Yao
*Assistant Examiner* — Alex Skripnikov
(74) *Attorney, Agent, or Firm* — Lee, Hong, Degerman, Kang & Waimey

(57) ABSTRACT

A communication method of a mobile station through a relay and a communication method of a relay system are disclosed. The communication method of a mobile station through a relay station comprises adding candidate relay information to channel status information periodically transmitted to a base station if a downlink signal quality value between the mobile station and the base station is less than a threshold value and a downlink signal quality value between at least one candidate relay station and the mobile station is higher than the downlink signal quality value between the mobile station and the base station; receiving information of a relay station selected among the at least one candidate relay station by the base station in accordance with the candidate relay information from the base station through a relay path indicator; and receiving data from the selected relay station at a time when the relay path indicator indicates. It is advantageous in that service delay of the mobile station is minimized and resources are efficiently used as the mobile station requests relay through the relay station in accordance with the channel status.

17 Claims, 6 Drawing Sheets

METHOD FOR COMMUNICATING IN A MOBILE STATION AND SYSTEM WITH RELAY STATIONS

This application claims the benefit of earlier filing date and right of priority to the Korean Patent Application No. 10-2008-0020886, filed on Mar. 6, 2008, which is hereby incorporated by reference as if fully set forth herein.

BACKGROUND OF THE INVENTION

1. Field of the Invention

The present invention relates to a relay system, and more particularly, to a communication method of a mobile station through a relay and a communication method of a relay system, in which the mobile station requests relay through a relay station in accordance with channel status to minimize service delay and use resources efficiently.

2. Discussion of the Related Art

A relay station (hereinafter, referred to as 'relay') is used to increase cell coverage and throughput of a mobile communication system. The relay is supported by a mobile station of IEEE 802.16e/16m, and may have a part of functions of a base station. The relay is an active repeater which includes network entry and mobility functions of PMP based relay, RRM function, and security function. The relay decodes a signal received from a transmitting side and again encodes the decoded signal to transfer the encoded signal to a receiving side, thereby removing noise. Also, the relay serves as a digital amplifier that can obtain higher throughput by using higher data rate coding. On the other hand, the relay has a drawback in that delay may occur during decoding and encoding. Also, the relay should consider backward compatibility of a PMP mode.

Types of the relay are divided as follows in accordance with mobility.

First of all, a fixed RS is permanently fixed to be used to increase cell coverage or shade zones. Also, the fixed RS may serve as a simple repeater. A nomadic RS is temporarily provided when users increase unexpectedly, or can optionally move within a building. A mobile RS can be mounted on a public traffic means such as bus or subway.

A frame structure for supporting a relay in a broadband radio access system according to the related art is as illustrated in FIG. 1.

A downlink zone of a relay (Relay DL Zone) and its uplink zone (Relay UL Zone) are established within a frame structure of a base station (BS frame structure) and a frame structure of the relay (RS frame structure). Data transmitted from the base station to the relay are allocated to a downlink of the BS frame structure in a burst type, and data transmitted from the relay to a mobile station or another neighboring relay are allocated to a downlink zone of the RS frame structure.

When the mobile station or the neighboring relay transmits data to the base station, the data is transmitted via a Relay UL Zone allocated to each mobile station, and the relay transmits the data to the base station via an uplink region allocated to the relay.

In order that the base station requests mobile station downlink signal quality information in the mobile communication system according to the related art, CQICH channel and report request (REP-REQ)/report response (REP-RSP) MAC messages are operated as follows.

In order that the base station acquires signal quality information of a downlink for the mobile station, there is provided a method for previously allocating some zones from a two-dimensional map of an uplink to a CQICH dedicated channel and then designating a subchannel to be used by each mobile station. UL-MAP IE within UL-MAP previously allocates a zone for CQICH channel using a fast-feedback channel and then designates a slot for each mobile station using CQICH_Alloc_IE. For example, MS#1 can designate CQICH#1, MS#2 can designate CQICH#2 and CQICH#3, and MS#3 can designate CQICH#4. Once the CQICH zone is allocated, the mobile station transmits signal quality information to the allocated CQICH zone at a period set in the CQICH_Alloc_IE. If the mobile station cancels the allocated CQICH, i.e., if duration=0 is set in the CQICH_Alloc_IE, the mobile station does not transmit signal quality information to the base station.

Report request (REP-REQ), i.e., channel measurement report request message is used when the base station operated at a bandwidth less than 11 GHz requests downlink channel measurement results such as RSSI and CINR of the mobile station.

Report response (REP-RSP), i.e., channel measurement report response message is used to respond to channel measurements listed in the report request message received in the mobile station. The mobile station transmits the channel measurement report response message which includes the measurement results of channels listed in the channel measurement report request message. Types of reported channel quality are determined in accordance with types of channels currently used in communication between the base station and the mobile station.

In the mobile communication system according to the related art, the base station determines whether to communicate with a corresponding mobile station through a relay by directly receiving signal quality information of downlink/uplink channels from the mobile station or receiving uplink signal quality information of the mobile station, wherein the uplink signal quality information is received by the relay.

However, when channel status between the relay and the mobile station is deteriorated, channel status between the base station and the mobile station is deteriorated, or channel status of a neighboring relay within a cell is more excellent than that between the base station and the mobile station, a report procedure of the mobile station to the base station through the relay is not defined.

Also, a procedure for a mobile station which intends to continue to connect a service with another relay within the base station to switch relay stations is not defined clearly, wherein the service is relayed from the base station to the mobile station through the relay.

SUMMARY OF THE INVENTION

Accordingly, the present invention is directed to a communication method of a mobile station through a relay and a communication method of a relay system, which substantially obviate ones or more problems due to limitations and disadvantages of the related art.

An object of the present invention is to provide a communication method of a mobile station through a relay, in which a mobile station reports and requests channel status of a relay and communication through the relay to a base station so that the base station determines whether to establish a communication path through the relay.

Another object of the present invention is to provide a communication method of a relay system, in which a base station or a relay transmits a relay path indicator to a mobile station to support a communication method through a relay.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a communication method of a mobile station through a relay station according to one embodiment of the present invention comprises adding candidate relay information to channel status information periodically transmitted to a base station if a downlink signal quality value between the mobile station and the base station is less than a threshold value and a downlink signal quality value between at least one candidate relay station and the mobile station is higher than the downlink signal quality value between the mobile station and the base station; receiving information of a relay station selected among the at least one candidate relay station by the base station in accordance with the candidate relay information from the base station through a relay path indicator; and receiving data from the selected relay station at a time when the relay path indicator indicates.

Preferably, the candidate relay information includes ID of a relay station having the highest signal quality value among the at least one candidate relay station measured by the mobile station.

Preferably, the candidate relay information includes a list of the at least one candidate relay station whose downlink signal quality is measured from the mobile station or a predetermined code.

Preferably, the method may further include transmitting a report response message including downlink signal quality information between the at least one candidate relay station and the mobile station to the base station if a report request message is received from the base station, wherein the base station takes into consideration the downlink signal quality information in selecting a relay station among the at least one candidate relay station.

Preferably, the relay path indicator includes time offset, and the step of receiving data includes receiving data from the selected relay station after the time offset.

Preferably, the relay path indicator includes a start frame number, and the step of receiving data includes receiving data indicated by the start frame number from the selected relay station.

In another aspect of the present invention, a communication method of a mobile station through a relay station according to another embodiment of the present invention comprises adding candidate relay information to channel status information periodically transmitted to a relay station connected with the mobile station if a downlink signal quality value between the mobile station and the connected relay station is less than a threshold value and a downlink signal quality value between at least one candidate relay station and the mobile station is higher than the downlink signal quality value between the mobile station and the relay station; receiving information of a relay station selected among the at least one candidate relay station by the base station in accordance with the candidate relay information from the base station through a relay path indicator; and receiving data from the selected relay station at a time when the relay path indicator indicates.

Preferably the method may further include transmitting a report response message including downlink signal quality information between the at least one candidate relay station and the mobile station to the base station if a report request message is received from the base station, wherein the base station takes into consideration the downlink signal quality information in selecting a relay station among the at least one candidate relay station.

Preferably, the method may further include transmitting a report response message including downlink signal quality information between the at least one candidate relay station and the mobile station to the connected relay station if a report request message is received from the connected relay station, wherein the base station takes into consideration the downlink signal quality information in selecting a relay station among the at least one candidate relay station.

In still another aspect of the present invention, a communication method of a relay system according to one embodiment of the present invention comprises adding candidate relay information to channel status information periodically transmitted to a base station from the mobile station if a downlink signal quality value between the mobile station and the base station is less than a threshold value and a downlink signal quality value between at least one candidate relay station and the mobile station is higher than the downlink signal quality value between the mobile station and the base station; transmitting a report request message to the mobile station if the base station identifies the candidate relay information through the channel status information; transmitting a report response message from the mobile station to the base station, the report response message including downlink signal quality information between the at least one candidate relay station and the mobile station; transmitting information of a relay station selected by the base station to the mobile station through a relay path indicator if the base station selects the relay station among the at least one candidate relay station in accordance with the candidate relay information and the downlink signal quality information; and receiving data from the selected relay station at the time when the relay path indicator indicates.

Preferably, wherein the step of receiving data includes transmitting data to be transmitted from the base station to the mobile station to the selected relay station.

Preferably, wherein the candidate relay information includes ID of a relay having the highest signal quality value among the at least one candidate relay station measured by the mobile station.

Preferably, wherein the candidate relay information includes a list of the at least one candidate relay station whose downlink signal quality is measured from the mobile station or a predetermined code.

In further still another aspect of the present invention, a communication method of a relay system according to another embodiment of the present invention comprises adding candidate relay information to channel status information periodically transmitted to a relay station connected with the mobile station if a downlink signal quality value between the mobile station and the connected relay station is less than a threshold value and a downlink signal quality value between at least one candidate relay station and the mobile station is higher than the downlink signal quality value between the mobile station and the relay station; transmitting information of a relay station selected by the base station to the mobile station through a relay path indicator if the base station selects the relay station among the at least one candidate relay station in accordance with the candidate relay information; and receiving data from the selected relay station by the mobile station at a time when the relay path indicator indicates.

Preferably, the method may further include transmitting a report request message to the mobile station if the base station identifies the candidate relay information from the channel status information received through the relay station connected with the mobile station; and transmitting a report response message from the mobile station to the base station, the report response message including downlink signal quality information between the at least one candidate relay station and the mobile station, wherein the base station takes into consideration the downlink signal quality information in selecting a relay station among the at least one candidate relay station.

Preferably, the method may further include transmitting a report request message to the mobile station if the relay station connected with the mobile station identifies the candidate relay information from the channel status information; transmitting a report response message including downlink signal quality information between the at least one candidate relay station and the mobile station from the mobile station to the relay station connected with the mobile station; and transmitting the downlink signal quality information from the relay station connected with the mobile station to the base station, wherein the base station takes into consideration the downlink signal quality information in selecting a relay station among the at least one candidate relay station.

Preferably, the method may further include transmitting information of direct communication with the base station to the mobile station through a relay path indicator if the base station does not select a relay station among the at least one candidate relay station for the mobile station; and directly transmitting data from the base station to the mobile station.

According to the embodiments of the present invention, it is advantageous in that service delay of the mobile station is minimized and resources are efficiently used as the mobile station requests relay through the relay in accordance with the channel status.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings.

DETAILED DESCRIPTION OF THE INVENTION

Reference will now be made in detail to the preferred embodiments of the present invention, examples of which are illustrated in the accompanying drawings. However, it is to be understood that various modifications can be made in the following embodiments of the present invention, and the scope of the present invention is not limited to the following embodiments.

In the embodiments of the present invention, a mobile station within a base station requests whether to perform communication through a relay.

The mobile station receives and transmits a service through the base station or the relay. When receiving data from the base station and the relay, the mobile station can identify a channel status or an uplink/downlink signal quality between the base station and the mobile station and a channel status or an uplink/downlink signal quality between the relay and the mobile station. The mobile station which is being communicated with the base station or connected with the base station through the relay can acquire synchronization of a relay within a cell and identify channel status through a periodical scanning procedure or by performing a scanning procedure whenever necessary.

If a downlink signal quality of the base station or the relay, which is received by the mobile station, is less than a threshold value, the mobile station may report it to the base station or the relay and request for a relay via the relay or the base station. The relay or the base station which is reported from the mobile station may select either communication through the relay or direct communication between the mobile station and the base station. In this case, CQICH channel and report request(REP-REQ)/report response(REP-RSP) MAC messages may be used. The mobile station exists within coverage of the base station. Channel status report for determining whether the mobile station performs communication through the relay and condition for requesting use/release of the relay will be described through the embodiments.

Figure 1:
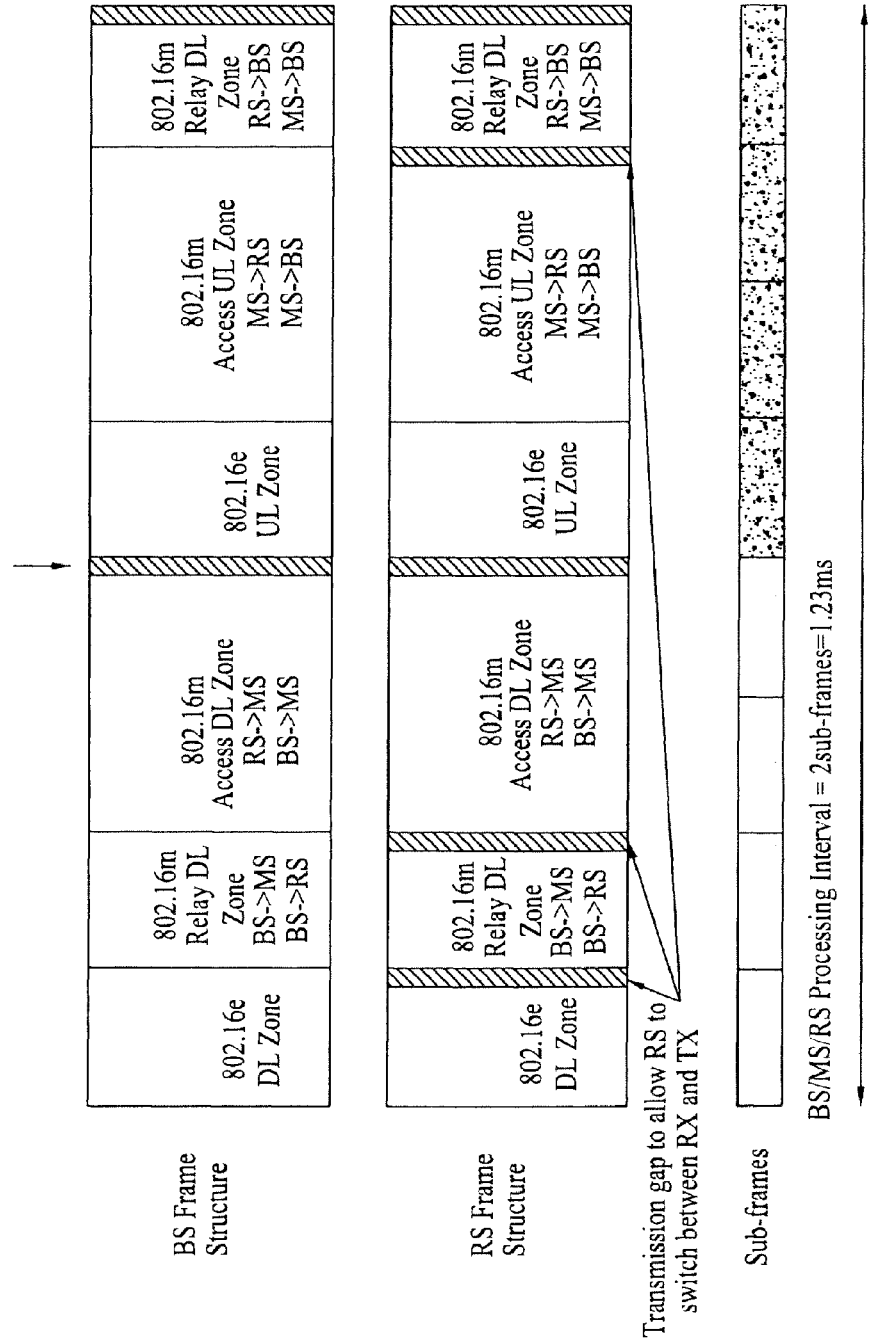
FIG. 1 is a diagram illustrating an example of a TDD frame structure which supports a relay.
Figure 2:
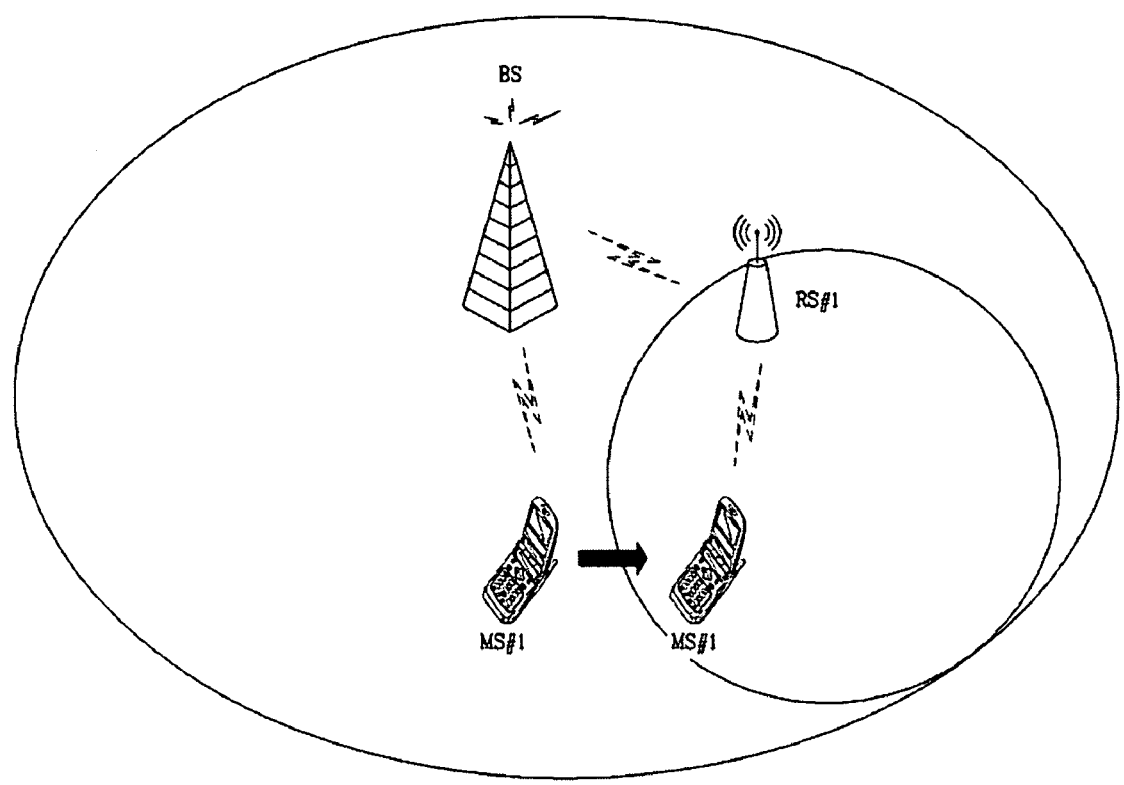
FIG. 2 is a diagram illustrating a communication method when channel status between a mobile station and a relay is improved.

FIG. 2 is a diagram illustrating a communication method when channel status between a mobile station and a relay is improved.

Referring to FIG. 2, the mobile station (MS#1) requests relay through a relay station (RS#1) while it is performing direct communication with the base station (BS). The mobile station (MS#1) which receives a service from the base station (BS) moves to a relay (RS#1) zone within a cell, or quality of a downlink signal of the base station (BS), which is received in the mobile station (MS#1), is deteriorated as the mobile station is far away from the base station (BS). In this case, if a quality of the downlink signal received from the relay (RS#1) is more than the threshold value and at the same time is more excellent than that between the base station (BS) and the mobile station (MS#1), the mobile station (MS#1) may request the base station (BS) or the corresponding relay (RS#1) to perform relay through the relay. The base station (BS) determines whether to perform relay based on information transmitted from the mobile station (MS#1) or information transmitted from the corresponding relay (RS#1).

Figure 3:
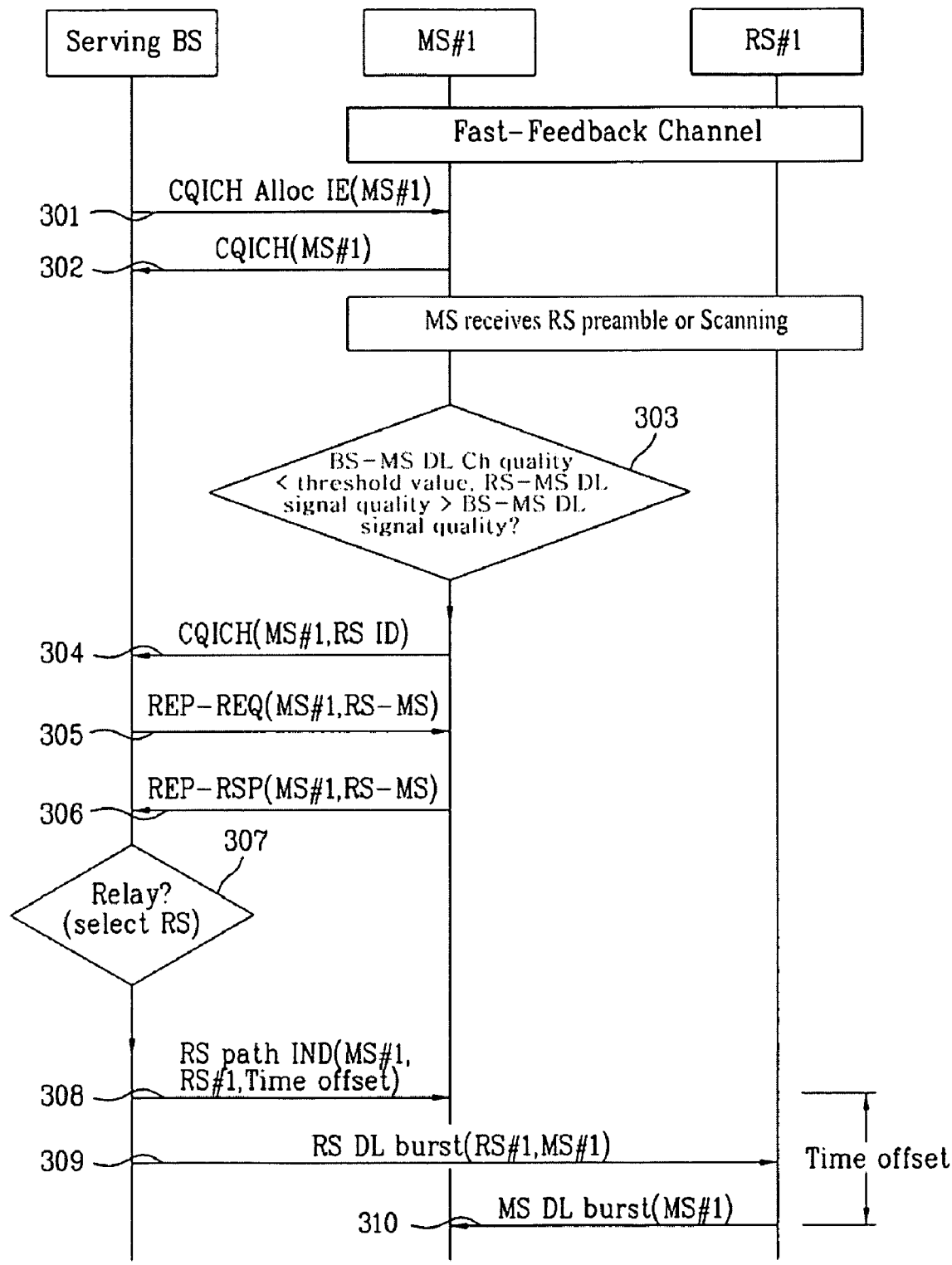
FIG. 3 is a flow chart illustrating a communication method of a relay system according to one embodiment of the present invention.

FIG. 3 is a signal flow chart illustrating a communication method of a relay system according to one embodiment of the present invention.

First of all, the base station (BS) previously allocates some zones from an uplink two-dimensional map to a CQICH dedicated channel so as to acquire downlink signal quality information of the mobile station (MS#1), and designates a subchannel to be used for each mobile station using CQICH_Alloc_IE so as to allow the mobile station to perform periodic report (301).

The corresponding mobile station transmits downlink signal quality information between the base station and the mobile station to the base station for a period designated in CH_Alloc_IE (302).

If the base station and the relay use different preambles from each other, or if the mobile station can identify the relay (RS#1), the mobile station can receive a signal of the relay by scanning the relay within the base station zone at any time or periodically or without separate scanning.

The mobile station identifies whether the downlink signal quality between the mobile station and the base station is less than the threshold value and at the same time downlink signal quality received from the relay is more excellent than the downlink signal quality between the mobile station and the base station (303).

If the downlink signal quality between the mobile station and the base station is less than the threshold value and at the same time the downlink signal quality received from the relay is more excellent than the downlink signal quality between the mobile station and the base station, the mobile station may transmit candidate relay information or a code previously designated for relay request to the relay during CQI report (304).

In this case, the candidate relay information may include a list of relays having downlink signal quality with the mobile station more excellent than that between the mobile station and the base station, ID of the relays and corresponding signal quality information. The information listed above may be transmitted to the base station via a channel status report which is periodically transmitted to the base station by the mobile station. For this transmission, MOB_SCN-REP or MOB_MSHO-REQ MAC message can be used.

If a single signal received from the relay, the mobile station transmits ID of the corresponding relay to the base station. If there are several relays transmitting relay signals within the base station, the mobile station may select a relay having the most excellent signal quality among the several relays to transmit ID of the selected relay to the base station. Also, if there are several relay lists identified by the mobile station, the mobile station can transmit a previously designated code.

If the base station receives CQI report of the mobile station, the base station can identify uplink signal quality of the corresponding mobile station. The base station transmits the report request (REP-REQ) MAC message to the mobile station to request downlink signal quality information between the relay and the mobile station, thereby acquiring detailed channel status information between the relay and the mobile station (305).

The mobile station transmits downlink signal quality information between the relay and the mobile station to the base station through the report response (REP-RSP) MAC message (306). At this time, the mobile station can transmit downlink signal quality information of a specific relay or downlink signal quality information of several relays acquired during scanning.

The base station determines whether to perform relay considering downlink signal quality information between the relay and the mobile station, which is received from the mobile station, and service status of the corresponding relay (307). If several downlink signal qualities of relays are transmitted, the base station may select a relay having the most excellent signal quality among the several relays to decide whether to perform relay to the selected relay.

Next, if the base station decides to perform communication with the mobile station through the relay, the base station transmits the corresponding relay and transmission time to the mobile station through a relay path indicator (308).

Meanwhile, the base station transmits data, which is to be transmitted to the mobile station, to the corresponding relay (309).

Finally, the mobile station receives the data of the relay after time offset designated by the relay path indicator or receives data of the relay in a start frame number designated by the relay path indicator.

Figure 4:
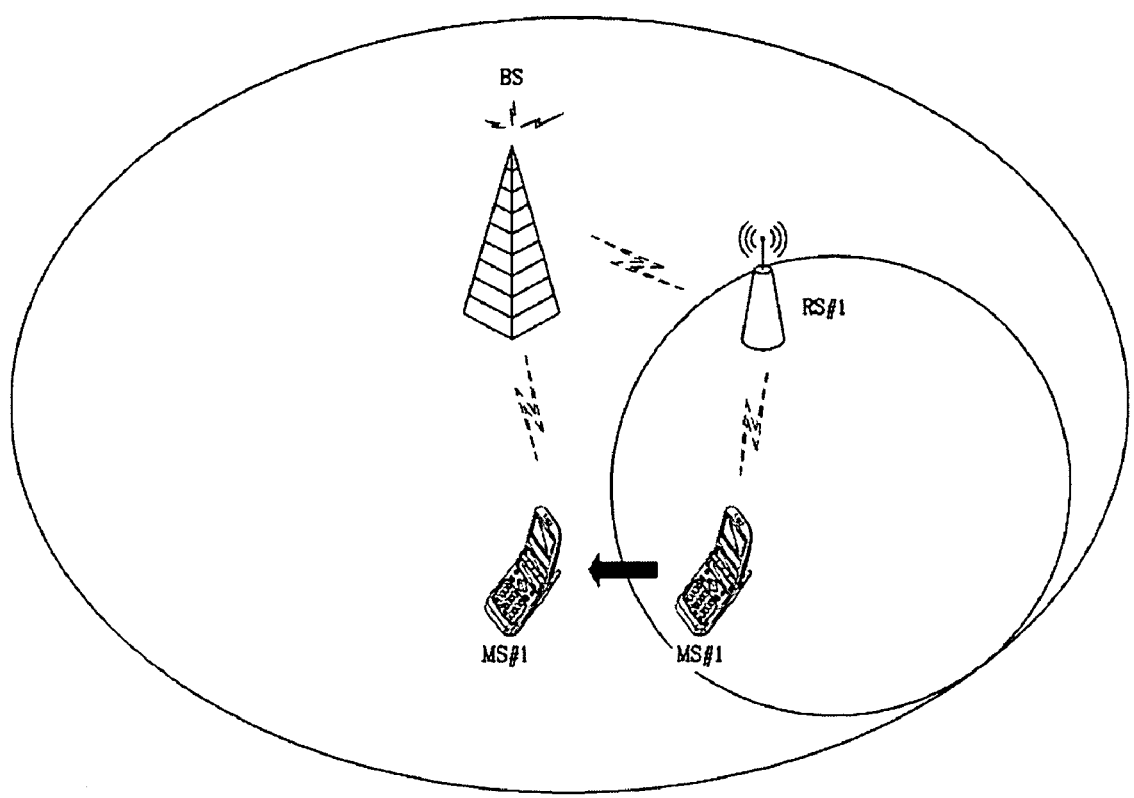
FIG. 4 is a diagram illustrating a communication method when channel status between a mobile station and a relay is deteriorated.

FIG. 4 is a diagram illustrating a communication method when channel status between the mobile station and the relay is deteriorated.

Referring to FIG. 4, when the base station (BS) and the mobile station (MS#1) are communicating with each other through the relay (RS#1), the mobile station requests direct communication with the base station (BS) or connection to another relay.

If the mobile station (MS#1) moves to the base station (BS) zone by passing through the relay (RS#1) zone while receiving a service of the base station (BS) through the relay, the channel status between the relay (RS#1) and the mobile station (MS#1) is deteriorated. At this time, the mobile station (MS#1) requests the relay (RS#1) or the base station (BS) to perform direct communication with the base station (BS). At this time, the mobile station (MS#1) can transmit the above request message including the channel status information between the relay (RS#1) and the mobile station (MS#1).

Figure 5:
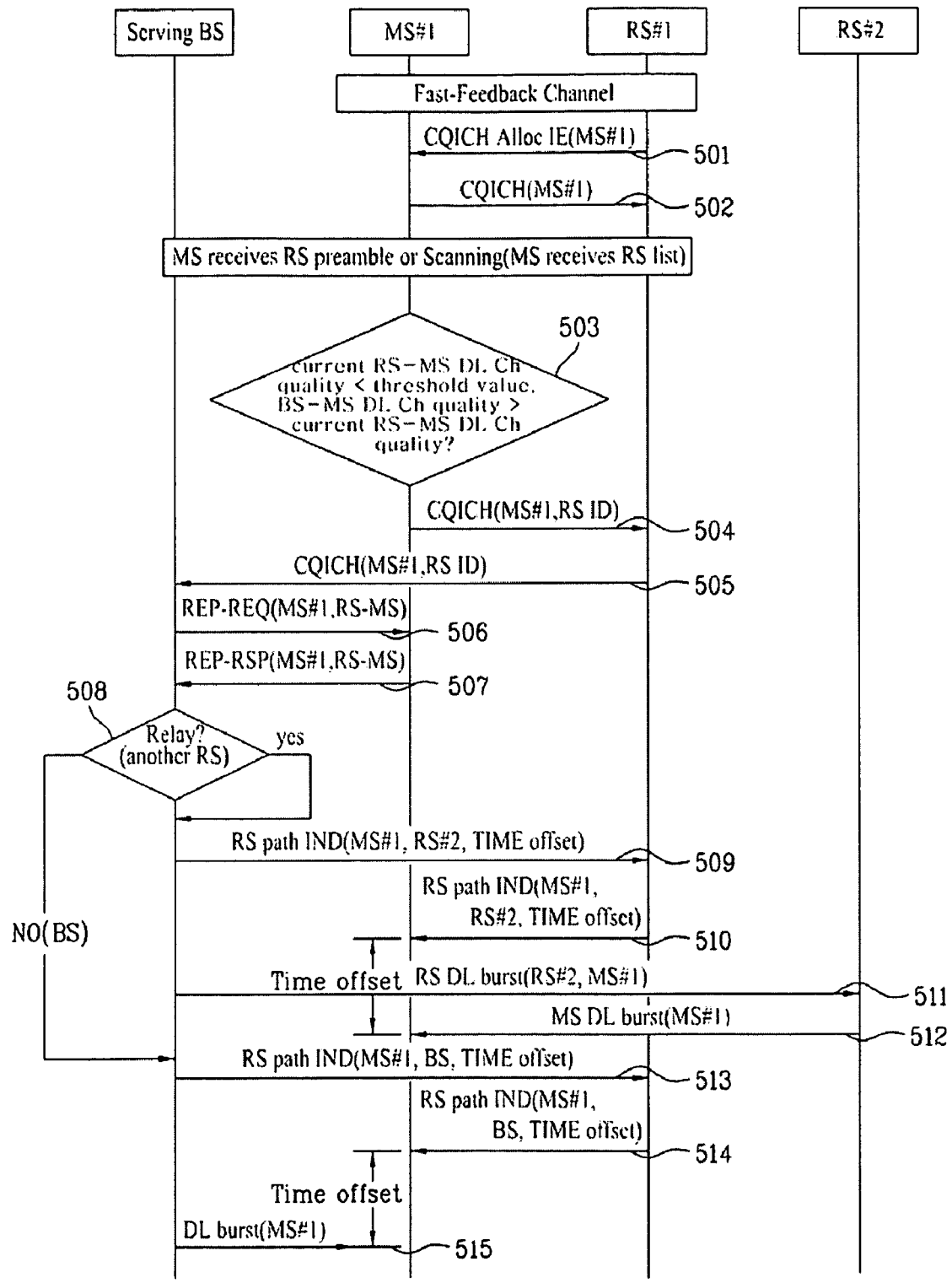
FIG. 5 is a flow chart illustrating a communication method of a relay system according to another embodiment of the present invention.

FIG. 5 is a signal flow chart illustrating a communication method of a relay system according to another embodiment of the present invention.

The base station (BS) previously allocates some zones from an uplink two-dimensional map of a relay zone to a CQICH dedicated channel so as to acquire downlink signal quality information of the mobile station (MS#1), and designates a subchannel to be used for each mobile station so as to allow the mobile station to periodically report channel status (501).

The mobile station transmits channel status information, i.e., downlink signal quality information of the relay (RS#1) to a relay currently connected with the mobile station, per period designated by the base station (502).

The relay can periodically transmit CQI received from each mobile station to the base station. Also, when the status of the mobile station is suitable for a specific condition, for example, when CQI transmitted from the mobile station is less than a threshold value, the relay can transmit CQI of the mobile station to the base station.

If the base station and the relay use different preambles from each other, or if the mobile station can identify the relay, the mobile station can scan the relay within the base station zone at any time or periodically or receive a signal of the relay. As above, if the mobile station can identify the channel status between the relay and the mobile station, the mobile station identifies whether downlink signal quality between the mobile station and the base station is less than the threshold value and signal quality received from the base station or downlink signal quality between the mobile station and another relay belonging to the above base station is more excellent than downlink signal quality between the mobile station and the relay established in the current path (503).

If downlink signal quality between the mobile station and the relay is less than the threshold value and the signal quality received from the base station or the downlink signal quality between the mobile station and another relay belonging to the above base station is more excellent than the downlink signal quality between the mobile station and the relay established in the current path, the mobile station can transmit candidate relay information to the relay during CQI report (504). In this case, as mentioned above, the candidate relay information may include a list of relays having downlink signal quality with the mobile station more excellent than that between the mobile station and the base station, ID of the relays and corresponding signal quality information.

Alternatively, if the above condition is satisfied, the mobile station can cancel the current relay path and transmit a code to the relay, wherein the code is previously designated to request a service of the base station.

If the mobile station transmits ID of a relay to the relay currently connected, it means that a single relay signal is received in the mobile station or the mobile station selects a relay having the most excellent signal quality among relays transmit signals to the mobile station. If the mobile station transmits the previously designated code, the downlink channel status received from the base station is more excellent than the channel status between the mobile station and the relay currently connected with the mobile station or the channel status received from another relay is more excellent than that from the relay currently connected with the mobile station.

Namely, the mobile station may transmit a relay list and corresponding signal quality, and downlink signal quality information between the base station and the mobile station to the relay established in the current path or the base station, wherein the relay list includes relays having downlink signal quality more excellent than the downlink signal quality between the relay and the mobile station. For this transmission, MOB_SCN-REP or MOB_MSHO-REQ MAC message can be used.

Next, the relay transmits candidate relay information received from the mobile station to the base station (505).

The base station transmits the report request (REP-REQ) MAC message to the mobile station to request downlink signal quality information between the relay and the mobile station in order to get more specific information, downlink signal information with a neighboring relay within the base station, and downlink signal quality information between the base station and the mobile station (506).

The mobile station transmits downlink signal quality information between the relay and the mobile station or between the base station and the mobile station to the base station through the report response (REP-RSP) MAC message (507). At this time, the mobile station can transmit downlink signal quality information of a specific relay or downlink signal quality information of several relays acquired during scanning.

Next, the base station determines whether to connect the mobile station with another relay by comparing the channel status between the base station and the mobile station, the channel status between the current relay and the mobile station, and the channel status between another relay (RS#2) within the base station zone and the mobile station with one another (508).

If the base station decides to connect the mobile station with another relay (RS#2), the base station transmits a relay path indicator to the existing relay (RS#1), wherein the relay path indicator includes the decided relay path (RS#2) of the mobile station and time for receiving data from the corresponding relay (RS#2) (509).

The existing relay (RS#1) transmits the information received from the base station to the mobile station (510).

Next, the base station transmits the data, which is to be transmitted to the mobile station, to the relay (RS#2) determined as the path of the mobile station (511).

The relay (RS#2) transmits the data to the corresponding mobile station after time offset designated by the relay path indicator (512).

Meanwhile, if the current channel status between the base station and the mobile station is more excellent than the case where the relay is used or if the base station intends to provide a direct service to the mobile station (508), the base station transmits the relay path indicator to the existing relay (RS#1), wherein the relay path indicator includes information of direct communication between the base station and the mobile station and time for receiving data from the corresponding base station (513). At this time, the existing relay (RS#1) transmits the information received from the base station to the mobile station (514). Finally, the mobile station determines the path based on the information included in the relay path indicator and receives data from the base station (515).

Figure 6:
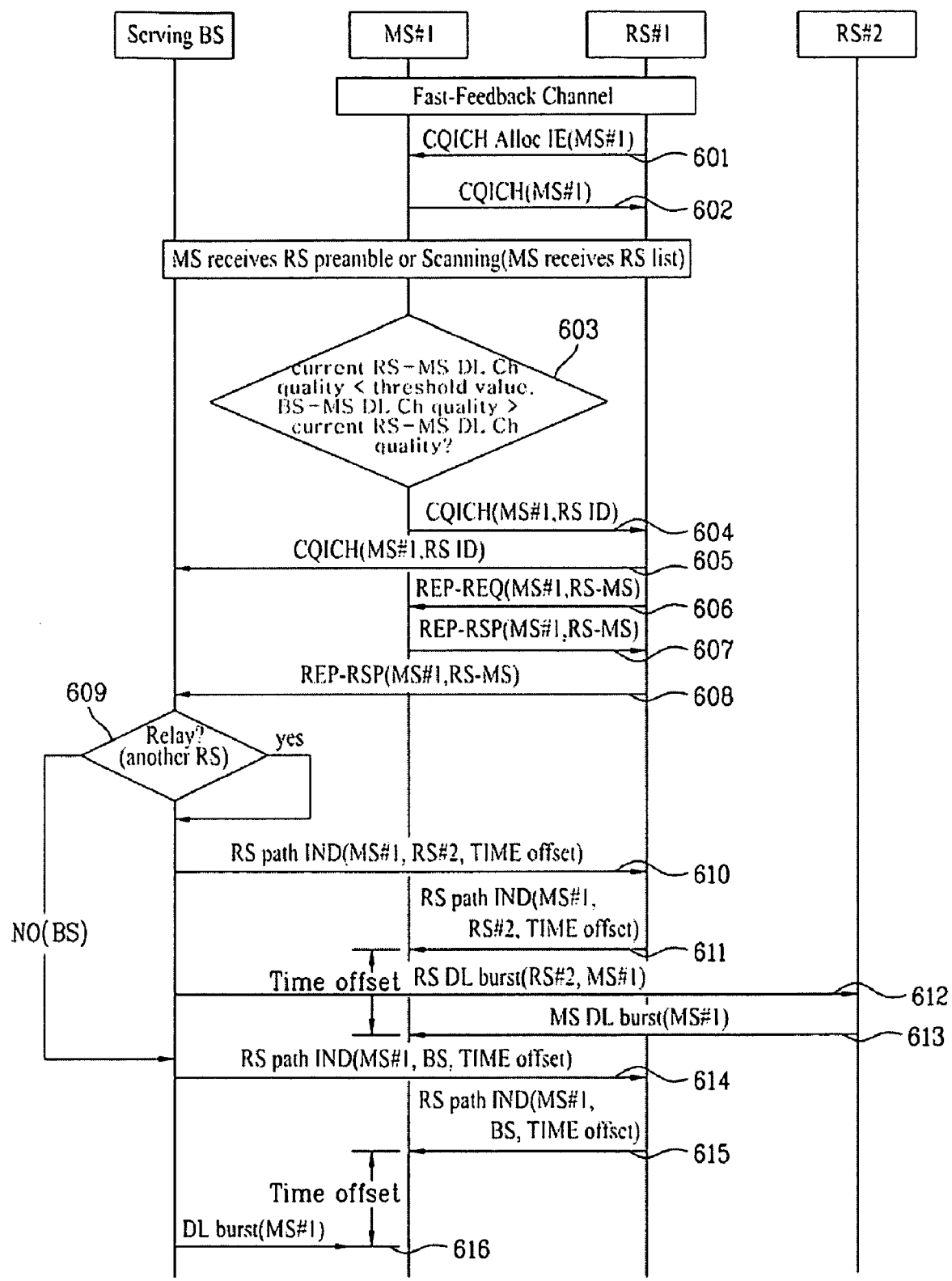
FIG. 6 is a diagram illustrating an example corresponding to a case where a relay transmits a report request message in FIG. 5.

FIG. 6 is a diagram illustrating a case where the relay transmits a report request message in FIG. 5.

The base station (BS) previously allocates some zones from an uplink two-dimensional map of a relay zone to a CQICH dedicated channel so as to acquire downlink signal quality information of the mobile station (MS#1), and designates a subchannel to be used for each mobile station so as to allow the mobile station to periodically report channel status (601).

The mobile station transmits channel status information, i.e., downlink signal quality information of the relay (RS#1) to a relay currently connected with the mobile station, per period designated by the base station (602).

The relay can periodically transmit CQI received from each mobile station to the base station. Also, when the status of the mobile station is suitable for a specific condition, for example, when CQI transmitted from the mobile station is less than a threshold value, the relay can transmit CQI of the mobile station to the base station.

If the mobile station can identify the channel status between the relay and the mobile station and the channel status between the base station and the mobile station, the mobile station identifies whether downlink signal quality between the mobile station and the relay is less than the threshold value and downlink signal quality between the mobile station and the base station or another relay is more excellent than that between the mobile station and the relay established in the current path (603).

If the downlink signal quality between the mobile station and the relay is less than the threshold value and the downlink signal quality between the mobile station and the base station or another relay is more excellent than that between the mobile station and the relay established in the current path, the mobile station can transmit candidate relay information including relay ID having excellent signal quality to the relay during CQI report (604). Alternatively, if the above condition is satisfied, the mobile station can cancel the current relay path and transmit a code to the relay, wherein the code is previously designated to request a service of the base station.

Next, the relay transmits candidate relay information received from the mobile station to the base station (605).

The relay transmits the report request (REP-REQ) MAC message to the mobile station to request downlink signal quality information between the relay and the mobile station, downlink channel information between a neighboring relay and the mobile station, and channel status information between the base station and the mobile station (606).

The mobile station transmits downlink signal quality information between the relay and the mobile station or between the base station and the mobile station to the base station through the report response (REP-RSP) MAC message (607). At this time, the mobile station can transmit downlink signal quality information of a specific relay or downlink signal quality information of several relays acquired during scanning.

Next, the relay can transmit the information received from the mobile station to the base station or transmit specific information, for example, path information having excellent signal quality to the base station (608).

Next, the base station determines whether to connect the mobile station with another relay by comparing the channel status between the base station and the mobile station, the channel status between the current relay and the mobile station, and the channel status between another relay (RS#2) within the base station zone and the mobile station with one another (609).

If the base station decides to connect the mobile station with another relay (RS#2), the base station transmits a relay path indicator to the existing relay (RS#1), wherein the relay path indicator includes the decided relay path (RS#2) of the mobile station and time for receiving data from the corresponding relay (RS#2) (610).

The existing relay (RS#1) transmits the information received from the base station to the mobile station (611).

Next, the base station transmits the data, which is to be transmitted to the mobile station, to the relay (RS#2) determined as the path of the mobile station (612).

The relay (RS#2) transmits the data to the corresponding mobile station after time offset designated by the relay path indicator (613).

Meanwhile, if the current channel status between the base station and the mobile station is more excellent than the case where the relay is used or if the base station intends to provide a direct service to the mobile station (609), the base station transmits the relay path indicator to the existing relay (RS#1), wherein the relay path indicator includes information of direct communication between the base station and the mobile station and time for receiving data from the corresponding base station (614). At this time, the existing relay (RS#1) transmits the information received from the base station to the mobile station (615). Finally, the mobile station determines the path based on the information included in the relay path indicator and receives data from the base station (616).

Table 1 illustrates an example of threshold values for DCD channel encoding.

TABLE 1

| Name | Type (1 byte) | Length | Value (variable length) |
|---|---|---|---|
| Relay_Add Threshold | X | 1 | Threshold used by the MS to add a RS to the BS path. When the CINR of between a RS and the MS is higher than Relay_Add threshold, the MS should send CQI code or REP-RSP to request adding this RS to current path. It is in the unit of decibels. |
| Relay_Delete Threshod | X | 1 | Threshold used by the MS to drop a RS from the BS path. When the CINR of between a RS and the MS is lower than Relay_Delete threshold, the MS should send CQI code or REP-RSP to request dropping this RS to current path. It is in the unit of decibels. |

Table 1 illustrates threshold values for determining whether the mobile station uses a relay to the base station. In Table 1, Relay_Add Threshold represents a threshold value for adding a relay between the mobile station and the base station as a path, and Relay_Delete Threshold represents a threshold value for canceling a relay established between the mobile station and the base station as a path.

Table 2 illustrates an example of channel measurement REP-REQ message format.

TABLE 2

| Syntax | Size (bit) | Notes |
|---|---|---|
| Report_Request_Message_Format( ) | — | — |
| Management Message Type = 36 | 8 | — |
| Report Request TLVs | variable | — |
| } | — | — |

Table 3 illustrates an example of REP-REQ management message encoding.

TABLE 3

| Name | Type | Length | Value |
|---|---|---|---|
| Report request | 1 | variable | Compound |

In the embodiment of the present invention, a parameter for requesting channel status information between the relay and the mobile station is added to the report request.

Table 4 illustrates an example of a report path indicator.

TABLE 4

| Name | Type | Length | Value |
|---|---|---|---|
| Report path indicator | x.x | 1 bit | 0: between BS and MS<br>1: between RS and MS |

The report path indicator of Table 4 is added to the report response (REP-RSP) message.

Table 5 illustrates an example of a message format of a relay path indicator (RS_Path_IND).

TABLE 5

| Syntax | Size (bit) | Notes |
|---|---|---|
| RS_Path-IND_Message_format( ) { | — | — |
| Management Message Type = xx | 8 | — |
| RS Indicator | 1 | 1: BS use RS for relaying |
| if (RS Indicator == 1){ | — | — |
| RS_ID | 48 | Applicable only when RS Indicator is set to 1 |
| Preamble index/ Subchannel Index | 8 | For the OFDMA PHY this parameter defines the PHY specific preamble for the target BS. |
| Action time(Start Frame number) | 8 | Action time when the MS shall update the path by it self |
| } | — | — |
| if(RS Indicator == 0){ | — | — |
| BS_ID | 48 | Applicable only when RS Indicator is set to 0. Same as the BSID parameter in the DL-MAP of BS |
| Preamble index/ Subchannel Index | 8 | For the OFDMA PHY this parameter defines the PHY specific preamble for the target BS. |
| Action time | 8 | Action time when the MS shall update the path by itself |
| } | — | — |
| } | | |

The relay path indicator of Table 5 includes information as to whether the corresponding mobile station uses a relay, information of either the relay determined as a path or base station, and a start time.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

What is claimed is:

1. A method for a mobile station to communicate through a relay station, the method comprising:
    adding candidate relay information to channel status information periodically transmitted to a base station connected to the mobile station if a downlink signal quality value between the mobile station and the connected base station is less than a threshold value and a downlink signal quality value between at least one candidate relay station and the mobile station is higher than the downlink signal quality value between the mobile station and the connected base station;
    receiving, through a relay path indicator, information of a relay station selected among the at least one candidate relay station in accordance with the candidate relay information; and
    receiving data from the selected relay station instead of from the connected base station at a time indicated by the relay path indicator.

2. The method according to claim 1, wherein the candidate relay information includes ID of a relay station having the highest signal quality value among the at least one candidate relay station measured by the mobile station.

3. The method according to claim 1, wherein the candidate relay information includes a list of the at least one candidate relay station whose downlink signal quality is measured from the mobile station or a predetermined code.

4. The method according to claim 1, further comprising:
    transmitting a report response message including downlink signal quality information between the at least one candidate relay station and the mobile station to the connected base station if a report request message is received from the connected base station,
    wherein the downlink signal quality information is for the connected base station in selecting a relay station among the at least one candidate relay station.

5. The method according to claim 1, wherein the relay path indicator includes time offset, and the step of receiving data includes receiving data from the selected relay station after the time offset.

6. The method according to claim 1, wherein the relay path indicator includes a start frame number, and the step of receiving data includes receiving data indicated by the start frame number from the selected relay station.

7. A method for a mobile station to communicate through a relay station, the method comprising:
    adding candidate relay information to channel status information periodically transmitted to a relay station connected with the mobile station if a downlink signal quality value between the mobile station and the connected relay station is less than a threshold value and a downlink signal quality value between at least one candidate relay station and the mobile station is higher than the downlink signal quality value between the mobile station and the connected relay station;
    receiving, through a relay path indicator, information of a relay station selected among the at least one candidate relay station in accordance with the candidate relay information; and
    receiving data from the selected relay station instead of from the connected relay station at a time indicated by the relay path indicator.

8. The method according to claim 7, further comprising:
    transmitting a report response message including downlink signal quality information between the at least one candidate relay station and the mobile station to a base station if a report request message is received from the base station,
    wherein the downlink signal quality information is for the base station in selecting a relay station among the at least one candidate relay station.

9. The method according to claim 7, further comprising:
    transmitting a report response message including downlink signal quality information between the at least one candidate relay station and the mobile station to the connected relay station if a report request message is received from the connected relay station,
    wherein the downlink signal quality information is for a base station in selecting a relay station among the at least one candidate relay station.

10. A communication method of a relay system, the communication method comprising:
    adding candidate relay information to channel status information periodically transmitted to a base station connected to a mobile station from the mobile station if a downlink signal quality value between the mobile station and the connected base station is less than a threshold value and a downlink signal quality value between at least one candidate relay station and the mobile station is higher than the downlink signal quality value between the mobile station and the connected base station;
    transmitting a report request message to the mobile station if the connected base station identifies the candidate relay information through the channel status information;
    transmitting a report response message from the mobile station to the connected base station, the report response message including downlink signal quality information between the at least one candidate relay station and the mobile station;
    transmitting, by the connected base station to the mobile station through a relay path indicator, information of a relay station selected by the connected base station if the connected base station selects the relay station among the at least one candidate relay station in accordance with the candidate relay information and the downlink signal quality information; and
    receiving, by the mobile station, data from the selected relay station instead of from the connected base station at a time indicated by the relay path indicator.

11. The communication method of claim 10, wherein the step of receiving data includes transmitting data to be transmitted from the base station to the mobile station to the selected relay station.

12. The communication method of claim 10, wherein the candidate relay information includes ID of a relay having the highest signal quality value among the at least one candidate relay station measured by the mobile station.

13. The communication method of claim 10, wherein the candidate relay information includes a list of the at least one candidate relay station whose downlink signal quality is measured from the mobile station or a predetermined code.

14. A communication method of a relay system, the communication method comprising:
- adding candidate relay information to channel status information periodically transmitted to a relay station connected with a mobile station if a downlink signal quality value between the mobile station and the connected relay station is less than a threshold value and a downlink signal quality value between at least one candidate relay station and the mobile station is higher than the downlink signal quality value between the mobile station and the connected relay station;
- transmitting, by a base station to the mobile station through a relay path indicator, information of a relay station selected by the base station if the base station selects the relay station among the at least one candidate relay station in accordance with the candidate relay information; and
- receiving, by the mobile station, data from the selected relay station instead of from the connected relay station at a time indicated by the relay path indicator.

15. The communication method of claim 14, further comprising:
- transmitting a report request message to the mobile station if the base station identifies the candidate relay information from the channel status information received through the relay station connected with the mobile station; and
- transmitting a report response message from the mobile station to the base station, the report response message including downlink signal quality information between the at least one candidate relay station and the mobile station,
- wherein the base station takes into consideration the downlink signal quality information in selecting a relay station among the at least one candidate relay station.

16. The communication method of claim 14, further comprising:
- transmitting a report request message to the mobile station if the relay station connected with the mobile station identifies the candidate relay information from the channel status information;
- transmitting a report response message including downlink signal quality information between the at least one candidate relay station and the mobile station from the mobile station to the relay station connected with the mobile station; and
- transmitting the downlink signal quality information from the relay station connected with the mobile station to the base station,
- wherein the base station takes into consideration the downlink signal quality information in selecting a relay station among the at least one candidate relay station.

17. The communication method of claim 14, further comprising:
- transmitting information of direct communication with the base station to the mobile station through a relay path indicator if the base station does not select a relay station among the at least one candidate relay station for the mobile station; and
- directly transmitting data from the base station to the mobile station.

* * * * *